United States Patent
Ham (10) Patent No.: US 9,225,185 B2
(45) Date of Patent: Dec. 29, 2015

(54) METHOD AND APPARATUS FOR CONTROLLING CHARGING IN ELECTRONIC DEVICE

(75) Inventor: Myungjoo Ham, Seoul (KR)

(73) Assignee: Samsung Electronics Co., Ltd. (KR)

( * ) Notice: Subject to any disclaimer, the term of this patent is extended or adjusted under 35 U.S.C. 154(b) by 553 days.

(21) Appl. No.: 13/538,354

(22) Filed: Jun. 29, 2012

(65) Prior Publication Data

US 2013/0099757 A1 Apr. 25, 2013

Related U.S. Application Data

(60) Provisional application No. 61/550,011, filed on Oct. 21, 2011.

(30) Foreign Application Priority Data

May 23, 2012 (KR) ........................ 10-2012-0054671

(51) Int. Cl.
*H02J 7/00* (2006.01)
*H02J 7/02* (2006.01)
*H02J 5/00* (2006.01)

(52) U.S. Cl.
CPC ............... *H02J 7/0047* (2013.01); *H02J 5/005* (2013.01); *H02J 7/0091* (2013.01); *H02J 7/025* (2013.01)

(58) Field of Classification Search
CPC ....... H02J 7/0047; H02J 7/0091; H02J 7/025; H02J 5/005
USPC .................. 320/108, 109, 118, 128, 137, 150
See application file for complete search history.

(56) References Cited

U.S. PATENT DOCUMENTS

| | | | | |
|---|---|---|---|---|
| 5,448,153 A * | 9/1995 | Ikeda et al. | ................... | 320/137 |
| 5,565,757 A * | 10/1996 | Ikeda et al. | ................... | 320/137 |
| 5,646,508 A * | 7/1997 | van Phuoc et al. | ............ | 320/152 |
| 6,177,780 B1 * | 1/2001 | Roy et al. | ....................... | 320/128 |
| 6,307,353 B1 * | 10/2001 | Shiojima | ....................... | 320/139 |
| 6,753,625 B2 * | 6/2004 | Kelsey | ........................... | 307/150 |
| 7,969,119 B2 * | 6/2011 | Odaohhara | ................... | 320/134 |
| 8,258,747 B2 * | 9/2012 | Andres et al. | ................. | 320/116 |
| 8,368,353 B2 * | 2/2013 | Akiba et al. | .................. | 320/109 |
| 8,723,527 B2 * | 5/2014 | Kudo et al. | .................... | 324/433 |
| 8,774,997 B2 * | 7/2014 | Ichikawa et al. | ................ | 701/22 |
| 2005/0057223 A1* | 3/2005 | Harada | ........................ | 320/128 |
| 2006/0071634 A1* | 4/2006 | Meyer et al. | .................. | 320/112 |
| 2006/0076934 A1* | 4/2006 | Ogata et al. | .................. | 320/136 |
| 2009/0121685 A1* | 5/2009 | Eto | ................................ | 320/152 |
| 2009/0278499 A1* | 11/2009 | Niculae et al. | ................ | 320/132 |
| 2010/0066305 A1* | 3/2010 | Takahashi et al. | ............ | 320/108 |
| 2010/0219795 A1* | 9/2010 | Morimoto et al. | ............ | 320/145 |

(Continued)

FOREIGN PATENT DOCUMENTS

| | | | |
|---|---|---|---|
| JP | 07107618 A | * | 4/1995 |
| JP | 07111736 A | * | 4/1995 |

*Primary Examiner* — Helen Rossoshek
(74) *Attorney, Agent, or Firm* — The Farrell Law Firm, P.C.

(57) ABSTRACT

A method for controlling charging in an electronic device for managing the electronic device, to stably charge a battery is provided. The method includes setting alarm such that a wake up signal is generated after a time elapses when entry into a suspend mode is requested during charging a battery or in a charging stop state, entering the suspend mode, waking-up and determining a state of the battery wake up, and turning-on or -off the battery charging according to the determined state of the battery.

20 Claims, 4 Drawing Sheets

(56) References Cited

U.S. PATENT DOCUMENTS

| | | | |
|---|---|---|---|
| 2010/0301798 A1* | 12/2010 | Chang et al. | 320/101 |
| 2011/0050169 A1* | 3/2011 | Akiba et al. | 320/109 |
| 2011/0298424 A1* | 12/2011 | Yamauchi et al. | 320/118 |
| 2011/0313613 A1* | 12/2011 | Kawahara et al. | 701/29 |
| 2012/0025769 A1* | 2/2012 | Kikuchi et al. | 320/118 |
| 2012/0161708 A1* | 6/2012 | Miura et al. | 320/118 |
| 2012/0176095 A1* | 7/2012 | Okuda et al. | 320/134 |
| 2013/0154552 A1* | 6/2013 | Siessegger | 320/108 |
| 2013/0314054 A1* | 11/2013 | Bergqvist et al. | 320/162 |
| 2013/0320922 A1* | 12/2013 | Acena et al. | 320/109 |
| 2014/0002025 A1* | 1/2014 | Yamamoto et al. | 320/109 |
| 2014/0062408 A1* | 3/2014 | Sekino et al. | 320/118 |
| 2015/0048786 A1* | 2/2015 | Katsumata et al. | 320/108 |

\* cited by examiner

METHOD AND APPARATUS FOR CONTROLLING CHARGING IN ELECTRONIC DEVICE

PRIORITY

This application claims priority under 35 U.S.C. §119(e) to a U.S. Provisional application filed on Oct. 21, 2011 in the U.S. Patent and Trademark Office and assigned Ser. No. 61/550,011, and under 35 U.S.C. §119(a) to a Korean patent application filed on May 23, 2012 in the Korean Intellectual Property Office and assigned Serial. No. 10-2012-0054671, the contents of each of which are incorporated herein by reference.

BACKGROUND OF THE INVENTION

1. Field of the Invention

The present invention relates generally to a method and an apparatus for controlling charging in an electronic device, and more particularly, to a method for controlling charging in an electronic device for managing the electronic device and for stably charging a battery, and an apparatus thereof.

2. Description of the Related Art

In recent years, with the significant development of information, communication and semiconductor technologies, supply and use of an electronic device have rapidly increased. The electronic device has provided various functions such as a call function, a music playback function, a character message transmission/reception function, a digital broadcasting receiving function, a near distance wireless communication function, and an Internet access function. The electronic device uses a battery, which is a chargeable secondary cell, due to portability.

When excessive physical force is applied to the battery or the battery is charged in a high or low temperature environment, a problem such as explosion may occur. Thus, the electronic device needs to continuously monitor a state (temperature) of a battery during charging. To do so in the prior art, however, the electronic device cannot enter a suspend state during battery charging.

The conventional electronic device cannot enter in the suspended state and controls charging while continuously monitoring the battery state, which causes excessive power consumption. Particularly, in the conventional art, when a battery is charged with a charger having a small charging amount, the battery can not be charged. Excessive heat is also generated due to continuous driving of an electronic component, diminishing battery life and potentially causing the battery to succumb to high temperature and possibly explode.

There has also been proposed a method using separate hardware components that consume less power, and in which a battery is monitored in a suspended state. However, the addition of separate hardware components increases manufacturing cost of the electronic device.

SUMMARY OF THE INVENTION

The present invention has been made in view of the above problems, and provides a method for controlling charging in an electronic device which allows the electronic device to enter a suspend mode without adding a separate hardware arrangement, and monitor a state of a battery to stably charge the battery, and an apparatus thereof.

In accordance with an aspect of the present invention, a method for controlling charging in an electronic device includes setting alarm such that a wake-up signal is generated after a time elapses when entry into a suspend mode is requested during charging a battery or in a charging stop state, and entering the suspend mode, waking-up to determine a state of the battery by at least partial structural components of the electronic device when the wake-up signal is generated by the set alarm in the suspend mode, and turning-on or -off the charging of the battery according to the determined state of the battery.

In accordance with another aspect of the present invention, an apparatus for controlling charging in an electronic device includes a charging unit for charging a battery of the electronic device, a temperature sensor for measuring a temperature of the battery, an alarm unit for setting alarm generating a wake-up signal after a preset time elapses, and a controller for activating the alarm unit and controlling such that the charging unit enters a suspend mode when the charging unit requests entry into the suspend mode in an enabled state, and for waking-up at least partial structural components to determine a temperature of the battery when a wake-up signal is generated by the alarm unit in the suspend mode, and turning-on/off the charging unit according to the determined result.

BRIEF DESCRIPTION OF THE DRAWINGS

The aspects, features and advantages of the present invention will be more apparent from the following detailed description in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of well-known functions and structures incorporated herein are omitted to for the sake of clarity and conciseness.

The electronic device according to the present invention is a terminal for providing a battery charging function, such as a mobile communication terminal, a Personal Digital Assistant (PDA), a Smart Phone, a tablet Personal Computer (PC), a Portable Multimedia Player (PMP), an Electronic Book terminal, a Notebook PC, a Netbook computer, or an Ultra Mobile Personnel Computer (UMPC).

As used herein, the term "suspend mode" is for minimizing power consumption, and refers to an idle mode, a rest mode, or a system saving mode.

As used herein, the term "wake up mode" refers to when an electrode is running as a comparison concept with the suspend mode. The wake up mode may include a full wake up mode in which the entire configuration of an electronic device wakes-up and a partial wake up mode in which only a partial configuration for controlling charging among the configuration of the electronic device wakes-up. For example, in the partial wake up mode, a temperature sensor for determining a state of a battery, a controller for turning-on/off charging according to the state of the battery, and a memory for storing an application program for charging management may wake up, and other structural components may not wake up. When the controller is a multi-core processor including a plurality of cores, only one core may wake up.

Hereinafter, "charge state" is when battery charging is being performed, and "charging stop state" is when battery charging is paused due to high temperature (e.g, greater than 63 degrees Celsius), low temperature (e.g., less than −3 degrees Celsius) or full charge. The high temperature and the low temperature may have different values according to an intention of manufacturer of the electronic device.

Figure 1:
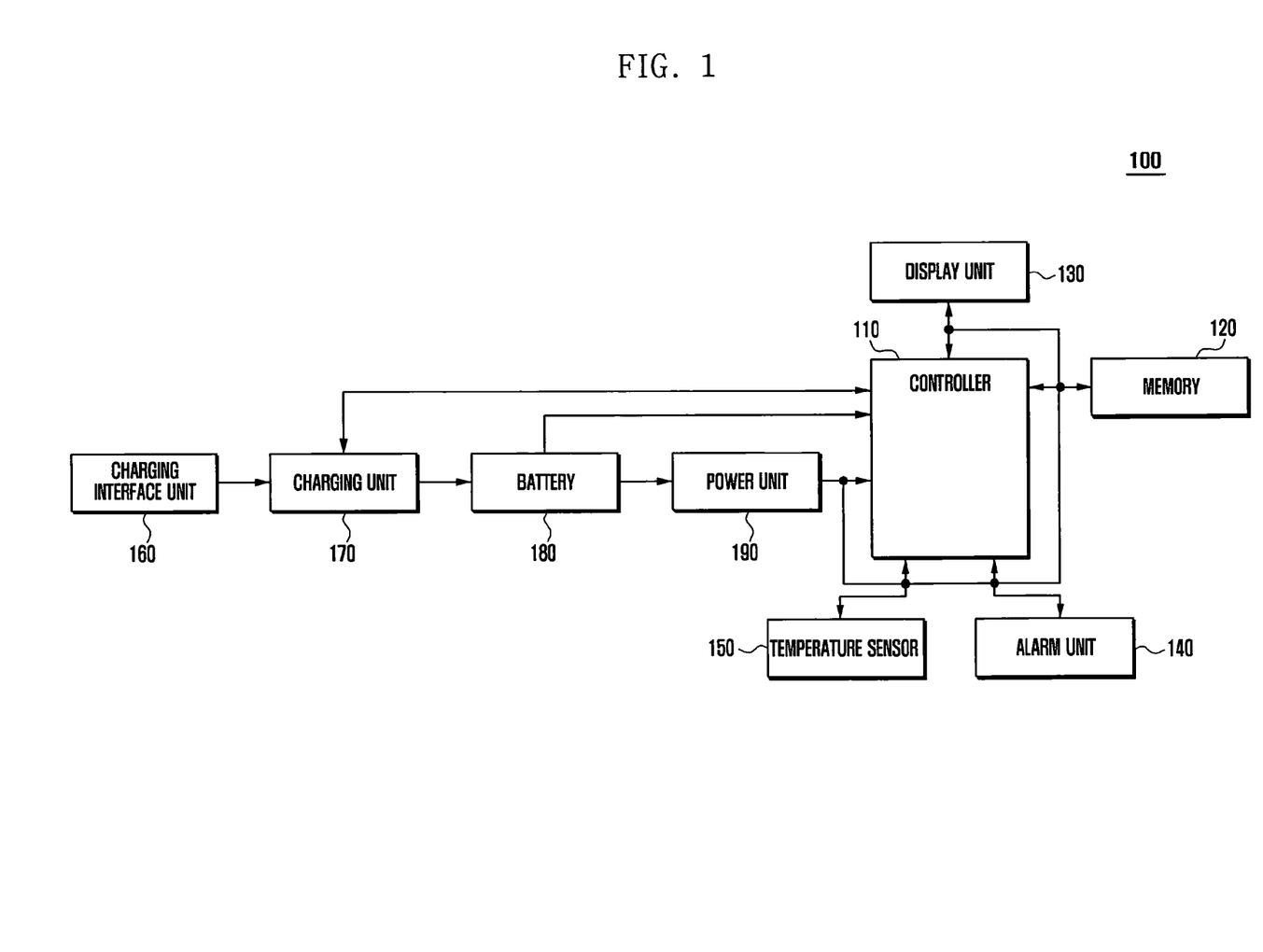
FIG. 1 illustrates a configuration of an electronic device according to an embodiment of the present invention.
Figure 2:
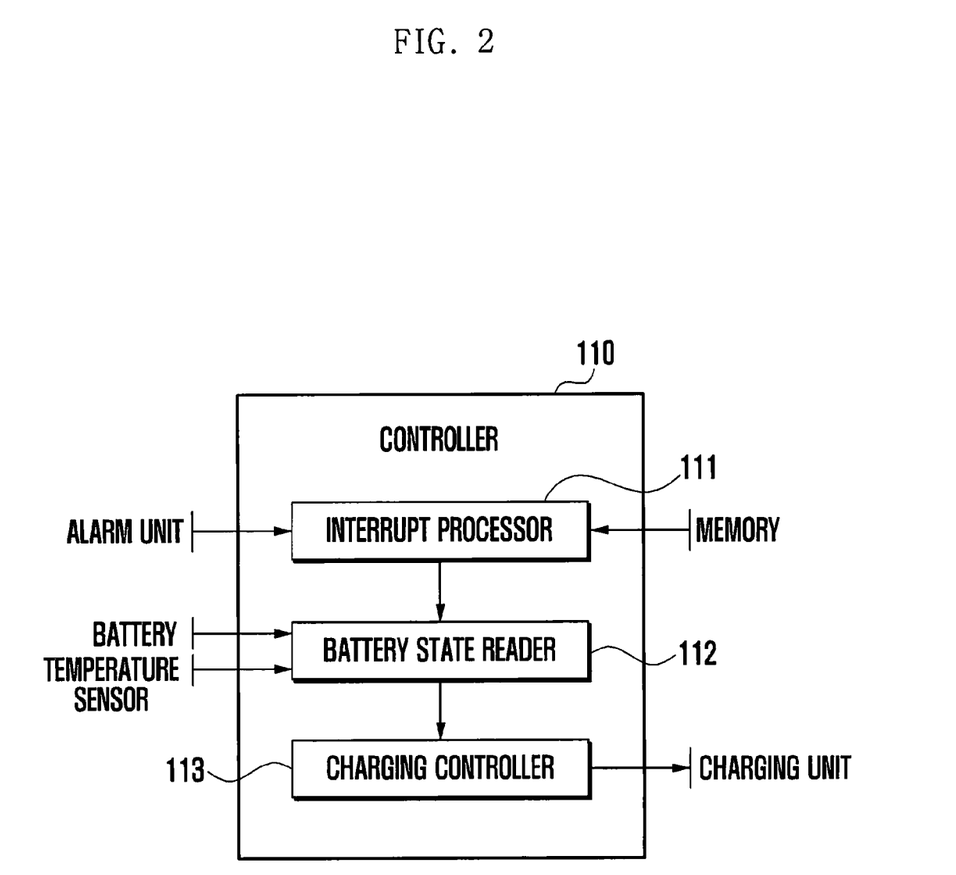
FIG. 2 illustrates a controller among a configuration of an electronic device according an embodiment of the present invention in detail.

FIG. 1 illustrates a configuration of an electronic device according to an embodiment of the present invention; and FIG. 2 illustrates a controller among a configuration of an electronic device according an embodiment of the present invention in detail.

Referring to FIGS. 1 and 2, an electronic device 100 may include a power unit 190, a battery 180, a charging unit 170, a charging interface unit 160, a temperature sensor 150, an alarm unit 140, a display unit 130, a memory 120, and a controller 110.

The charging interface unit 160 is connected to a charger (not shown), which may include a travel, Universal Serial Bus (USB), and solar heat charger. The charging interface unit 160 included in a current electric device 100 has a standard micro USB. However, the present invention is not limited thereto. That is, persons of ordinary skill in the art will appreciate that the charging interface unit 160 is formed by various sizes according to a manufacturer's choice. When the electronic device 100 supports wireless charging, the charging interface unit 160 is substituted by a receiving coil (not shown) for generating an induction current through a magnetic field generated from a transmission coil included in a wireless charging pad (not shown).

The charging unit 170 may charge the battery 180 using power input from a charger (not shown) connected to the charging interface unit 160. The charging unit 170 is turned-on/off under control of the controller 110 to stably charge the battery 180. For example, when the temperature of the battery 180 is less than or equal to a preset low reference value (e.g, −3 degrees Celsius) or greater than or equal to a preset high reference value (e.g, 63 degrees Celsius), the charging unit 170 is turned off in a full charge state, such as when charging current is less than or equal to 50 mA. When the charging continues longer than a preset time, such as 6 hours, the charging unit 170 is turned off. When voltage drops to lower than a set voltage, such as 4.1 V, or is less than or equal to the set voltage after a time period such as 30 seconds elapses in the full charge state, the charging unit 170 is turned-on to recharge the battery 180.

The charging unit 170 may be turned-on/off according to other situations for stably charging the battery 180. In the meantime, when the voltage of the battery 180 is less than or equal to a PreQualification (PQ) threshold value, such as 3.0V, the charging unit 170 may perform high speed charging.

The battery 180 is a secondary chargeable cell that is manufactured in various forms such as a nickel, cadmium, nickel-cadmium, lithium-ion, lithium-polymer, and a chemical cell. The battery supplies power to respective structural components of the electronic device 100 through the power unit 190, which receives the power from the battery 180, converts the received power into an appropriate voltage, and supplies the appropriate voltage of the respective structural components of the electronic device 100. The power unit 190 may include a Power Management Integrated Circuit (PMIC).

The temperature sensor 150 measures a temperature of the battery 180, and transmits the measured temperature to the controller 110. It is preferable that the temperature sensor 150 is located adjacent to the battery 180 to measure an exact temperature. The temperature sensor 150 is provided inside the battery 180, and may be a thermistor. However, the present invention is not limited thereto, as temperature sensor 150 may be various temperature measuring devices capable of measuring the temperature and transmitting the measured temperature to the controller 110.

The alarm unit 140 is for generating an interrupt signal if a preset alarm time, such as 30 seconds, elapses. When entry into a suspend mode of the electronic device 100 is requested or reentry from a partial wake-up mode to a suspend mode is requested, the alarm unit 140 is activated. That is, when the electronic device 100 enters the suspend mode or re-enters from a partial wake up mode to the suspend mode, alarm of the alarm unit 140 is set. The alarm unit 140 may generate a wake up signal every alarm period until a full wake up event occurs, and is implemented by a Real Time Clock (RTC) or a timer.

The display unit 130 displays information input by or provided to the user as well as various menus of the electronic device 100. That is, the display unit 130 may provide various screens, such as a home screen, a menu screen, a message creation screen, a call screen, a schedule management screen, an address book screen, and a web page output screen according to use of the electronic device 100. In particular, the display unit 130 may display a charging relation message.

For example, when the battery 180 is changed from a charging state to a charging stop state in a partial wake up mode, or is changed from the charging stop state to the charging state, the display unit 130 may display a message indicating the change. When the battery 180 enters a suspend mode, the display unit 130 is turned off. When a partial wake up event occurs, the display unit 130 may not be turned-on. When a full wake up event occurs, the display unit 130 is turned-on. The display unit 130 is configured by a Liquid Crystal Display (LCD), an Organic Light Emitted Diode (OLED), or an Active Matrix Organic Light Emitted Diode (AMOLED). When the display unit 130 is configured by a touch screen type, it may act as an input unit (not shown).

The memory 120 may store an Operating System (OS) of the electronic device 100, an application program necessary for other options functions, such as a voice playback function, an image or moving image playback function, or a broadcasting playback function, user data, and transmitted/received data during communication. For example, the memory 120 may store a moving image file, a game file, a music file, and a movie file, as well as a charging management program for controlling charging of the battery 180.

The charging management program determines a state of the battery 180 in a polling scheme. That is, the charging management program may periodically determine a temperature of the battery 180 through the temperature sensor 150 to determine a state of the battery 180. Furthermore, the charging management program determines a voltage and a current of the battery 180, insertion/removal, presence of full charge/discharge, a recharging condition of the battery 180 or a charger to control on/off and charging speed of the charger 170.

The charging management program includes a routine of determining an occurrence reason of a wake up event when the wake up event occurs by an alarm unit 140 in a suspend mode, determining a state of the battery 180 through the temperature sensor 150 when there is only the occurrence reason of the wake up reason during an alarm period of the alarm unit as the determining result, determining whether the state of the battery 180 satisfies a preset charging condition to stably charge the battery 180, turning-on the charger 170 to charge the battery 180 when the state of the battery 180 satisfies the preset charging condition, and turning-off the charger 170 to stop charging of the battery 180 when the state of the battery 180 does not satisfy the preset charging condition, and controlling on/off of the charger 170 according to a state of the battery 180, resetting an alarm, and requesting reentry into the suspend mode.

The charging management program may read a register or a system memory area to confirm the occurrence reason of the wake up event. The charging management program is implemented in a Kernel or a user application area.

The controller 110 controls an overall operation of the electronic device 100 and signal flow between internal blocks of the electronic device 100, and performs a data processing function for processing data. For example, the controller 110 is a Central Processing Unit (CPU), a Micro Processor Unit (MPU), or an Application Processor. When the charging unit 170 requests entry into a suspend mode in an enabled state, the controller 110 activates the alarm unit 140 and controls entry into the suspend mode. The enabled state of the charging unit 170 refers to when the charger is connected to the charging interface unit 160, and includes a state in which the battery 180 is charged and in which charging is paused due to full charge or high temperature/low temperature. Conversely, a disabled state of the charging unit 170 refers to when the charge is not connected to the charging interface unit 160.

When a wake up signal is generated by the alarm unit 140 in the suspend mode, the controller 110 may wake up at least partial structural components. For example, when the controller 110 is a multi-core processor with a plurality of cores, it may turn-on only one core. To measure a temperature of the battery 180, the controller 110 may activate the temperature sensor 150 and drive the charging management program. As described above, only the partial structural components are turned-on to minimize current consumption.

The controller 110 determines the temperature of the battery 180 and turns on/off the charging unit 170 according to the determined temperature of the battery 180. After turning-on/off the charging unit 170, the controller 110 may re-enter the suspend mode and reset the alarm.

To do so, the controller 110 may include an interrupt processor 111, a battery state reader 112, and a charging controller 113. The interrupt processor 111 may receive an interrupt signal (wake up signal) generated by the alarm unit 140 and various interrupt signals. When receiving the interrupt signal, the interrupt processor 111 determines an occurrence reason of a wake up event.

The battery state reader 112 may read whether the battery 180 satisfies the charging condition. In particular, when the electronic device 100 wakes-up in the suspend mode by the alarm unit 140, the battery state reader 112 determines a temperature of a battery 180 through a temperature sensor 150 to determine whether a state of the battery satisfies the charging condition based on the determined temperature. For example, when the temperature of the battery 180 is in the range of a lower temperature reference value to a higher temperature reference value, the battery state reader 112 may determine that the charging condition is satisfied. The battery state reader 112 may transmit the read result to the charging controller 113.

The charging controller 113 may control on/off and charging current of the charging unit 170. In particular, when the electronic device wakes-up in a suspend mode by an alarm unit 140, the charging controller 113 turns on/off the charging unit 170 according to a read result provided from the battery state reader 112. For example, when the temperature of the battery 180 satisfies a charging condition, the charging controller 113 turns on the charging unit 170. When the temperature of the battery 180 does not satisfy the charging condition, the charging controller 113 turns off the charging unit 170.

Although not shown in FIG. 1, the electronic device 100 may further include structural components having an additional function such as a Global Positioning System (GPS) module for receiving location information, a broadcasting receiving module for receiving broadcasting, a digital sound source module such as a Motion Pictures Experts Group (MPEG) Layer Audio 3 (MP3) module, and an Internet communication module for performing an Internet function.

Figure 3:
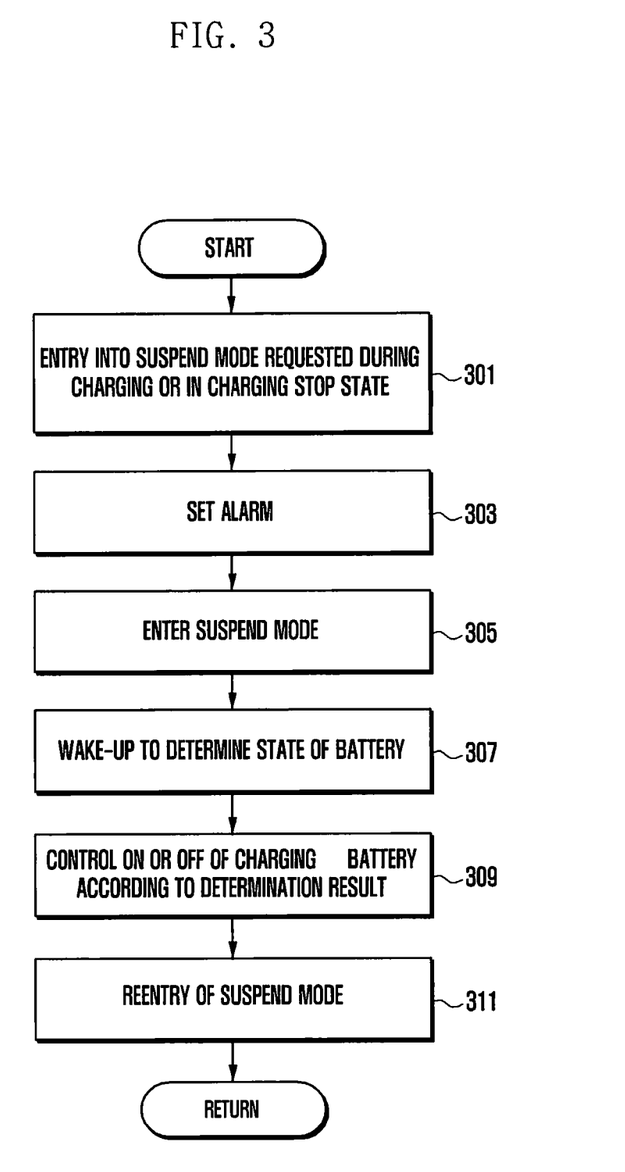
FIG. 3 illustrates a method for controlling charging in an electronic device according to an embodiment of the present invention.

FIG. 3 illustrates a method for controlling charging in an electronic device according to an embodiment of the present invention.

Referring to FIGS. 1 to 3, a controller 110 senses whether an electronic device 100 requests entry into a suspend mode during charging or in a charging stop state in step 301. The requesting entry into the suspend mode is sensed when there is no input for longer than a time period or a key or menu signal for requesting entry into the suspend mode is input.

When the requesting entry into the suspend mode is sensed, the controller 110 sets alarm in step 303 and enters the suspend mode in step 305. For example, the controller 110 may set alarm such that an interrupt signal for waking-up at least partial structural components of the electronic device 100 after a time period elapses and enter the suspend mode. The alarm is set using a Real Time Clock (RTC) or a timer. When generating the alarm, it is implemented such that an entire configuration of the electronic device 100 wakes-up or partial structural components for managing charging the battery 180 wake up. However, it is preferable to wake up the partial structural components in consideration of current consumption.

When an interrupt occurs according to alarm, the controller 110 may wake up to determine a state of a battery in step 307, and control (on or off) charging of the battery 180 according to the determination result in step 309. For example, the controller 110 determines a temperature of the battery 180 through the temperature sensor 150. When the temperature of the battery 180 is greater than or equal to a preset high temperature reference value, such as 63 degrees Celsius, or less than or equal to a preset low temperature reference value, such as −3 degrees Celsius, the controller 110 may stop charging of the battery 180 in order to prevent danger such as explosion of the battery 180. When the temperature of the battery 180 is the range of −3 degrees Celsius to 63 degrees Celsius, the controller 110 may charge the battery 180.

The controller 110 then requests reentry of the suspend mode in step 311 and returns to step 303 and repeats the foregoing procedures.

As described above, the present invention sets alarm when entry into the suspend mode is requested, partial structural components of the electronic device 100 for managing charging of the battery 180 wake up to determine a state of the battery 180, and controls the charging according to the determined result and re-enters the suspend mode.

Figure 4:
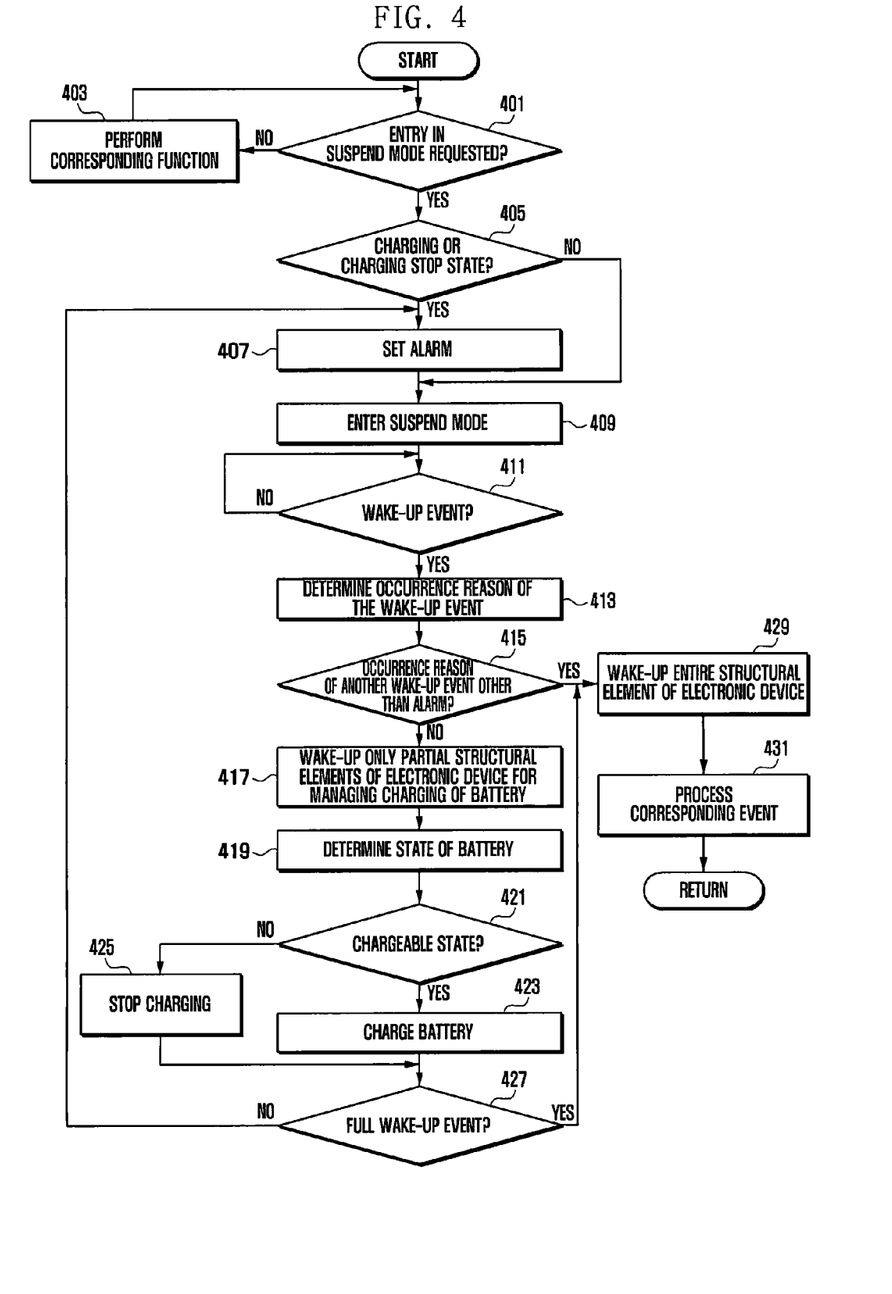
FIG. 4 illustrates a method for controlling charging in an electronic device according to an embodiment of the present invention in detail.

FIG. 4 illustrates a method for controlling charging in an electronic device according to an embodiment of the present invention.

Referring to FIGS. 1 to 4, a controller 110 determines whether entry into the suspend mode is requested in step 401. When the entry into the suspend mode is not requested, the controller 110 performs a corresponding function in step 403, such as a music playback function, a call function, and a photographing function according to a request of the user. When the entry into the suspend mode is requested, the controller 110 determines whether the electronic device is in a charging state or a charging stop state in step 405.

When the electronic device is not in the charging state and the charging stop state, the controller 110 enters the suspend mode in step 409. When the electronic device is in the charging state or the charging stop state, the controller 110 sets the alarm in step 407. After a time period elapses, the alarm is set to generate an interrupt signal for waking-up partial structural components of the electronic device 100. The alarm is set using a RTC or a timer.

When the alarm setting is completed, the controller 110 enters the suspend mode in step 409 and determines whether a wake up event occurs in step 411. When it is determined that the wake up event does not occur, the controller 110 repeatedly performs step 411. When the wake up signal is generated, the controller 110 determines an occurrence reason of the wake up event in step 413, and determines whether there is an occurrence reason of another wake up event other than the set alarm in step 415. The occurrence reason of the wake up event is stored in a register or a system memory area.

When it is determined that there is no occurrence reason of another wake up event other than the set alarm, that is, when there is only an occurrence reason of the wake up event due to the alarm, the controller 110 wakes up only partial structural components of the electronic device 100 for managing charging of the battery 180 in step 417. For example, when the controller 110 is a multi-core processor, it wakes up one core, the temperature sensor 150 and the memory 120. When the partial structural components of the electronic device 100 wake up, the controller 110 determines a state of the battery 180 in step 419. For example, the controller 110 determines a temperature of the battery 180 through the temperature sensor 150.

The controller 110 determines whether the electronic device is in a chargeable state in step 421, such as by determining whether the temperature of the battery 180 ranges from a lower temperature reference value, such as −3 degrees Celsius, to a higher temperature reference value, such as 63 degrees Celsius. When it is determined that the electronic device is in the chargeable state, the controller 110 controls a charging unit 170 to charge the battery 180 in step 423. That is, the controller 110 controls the charging unit 170 to maintain a charging state when the electronic device is being charged, and to restart the charging when the electronic device is in a charging stop state.

When it is determined that the electronic device is not in the chargeable state at step 421, the controller 110 controls to stop charging of the battery 180 in step 425. That is, the controller 110 controls the charging unit 170 to stop the charging when the electronic device is in the charging state and to maintain a charging stop state when the electronic device is in the charging stop state.

The controller 110 determines whether a full wake up event occurs in step 427. For example, the full wake up event may occur when the charger (not shown) is removed. The full wake up event may include call reception, character reception, and key input.

When the full wake up event does not occur at step 427, the controller 110 returns to step 407 and repeats the foregoing steps. That is, the controller 110 sets an alarm and re-enters a suspend mode. When the full wake up event occurs at step 427, the controller 110 proceeds to step 429 and wake up entire structural components of the electronic device in step 429 and processes a corresponding event in step 431. For example, when a call receiving event occurs, the controller 110 outputs at least one of mute, vibration, and bell sound informing call reception, and outputs a call receiving screen on a display unit 130.

When the processing of the corresponding event is completed, the controller 110 returns to step 401. In this case, because it is in the wake up state, the controller 110 determines a state of the battery 180 and controls charging of the battery 180 according to the determined result. As described above, steps 401 to 431 are repeatedly performed until a charger (not shown) is removed.

As described above in the present invention, an alarm is set when entering a suspend mode, configurations for controlling charging wake up every alarm period to determine a state of a battery, charging on/off is controlled according to the state of the battery and the suspend mode is re-entered. Accordingly, the present invention alleviates the requirement of a separate hardware arrangement for entering a suspend mode while charging the battery and controlling charging of the battery in the suspend mode.

The method for controlling charging in an electronic device of the present invention is implementable in an executable program command form by various computer means and be recorded in a computer readable recording medium, which may include a program command, a data file, and a data structure individually or a combination thereof. The program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. The program command includes a machine language code created by a complier and a high-level language code executable by a computer using an interpreter. The foregoing hardware device may be configured to be operated as at least one software module to perform an operation of the present invention.

Although not illustrated, when the electronic device includes a plurality of batteries, it may sequentially check a plurality of batteries to control charging. For example, when the electronic device include three batteries, the charging control method determines a state of each of a first, second, and third battery to on/off of charging.

Further, if there is one alarm timer, the controller determines, when alarm set or reset for generating the wake-up signal is requested, whether another alarm (e.g., morning call) different from the alarm is set. When another alarm is set, the controller may store the another alarm and enter a suspend mode. This is performed to prevent the another alarm from being erased because the alarm covers the another alarm previously set during setting or resetting the alarm according to use of one timer. In detail, when setting or resetting the alarm, the controller compares the another alarm time with an alarm time. When the another alarm time is less than the alarm time, the controller may set the another alarm in the timer and set the alarm in the timer after completing the another alarm. For example, when the alarm setting or resetting is requested when an alarm period is 30 seconds and the another alarm time of 20 seconds remains, the controller sets the timer to count the another alarm and sets the timer to count the alarm after completing the another alarm.

As mentioned above, the method and the apparatus for controlling charging in an electronic device according to the present invention may enter a suspend mode during charging a battery to reduce current consumption without adding a separate hardware capable of monitoring a state of the battery, and monitor the state of the battery to stably charge the battery. Accordingly, the present invention may secure stability with respect to the battery charging while reducing a cost of an electronic device. Further, an electronic device of the present invention without separate hardware for monitoring a state of a battery in a suspend mode may enter the suspend mode during charging the battery to increase battery charging speed. In addition, the present invention may enter a suspend mode during the charging to reduce generation of heat, which results in an increase in battery life.

Although a method and an apparatus for controlling charging in an electronic device according to embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for controlling charging in an electronic device, the method comprising:
   setting, by the electronic device, an alarm, and entering the electronic device into a suspend mode, when entry into the suspend mode is requested while at, least one battery of the electronic device is in a charging state or in a charging stop state, wherein the alarm generates a wake up signal after a time period set for the alarm elapses;
   waking up at least partial structural components of the electronic device, in response to the wake up signal;
   determining a status of the at least one battery using the at least partial structural components of the electronic device; and
   turning on or off the charging of the at least one battery, according to the determined status of the at least one battery.

2. The method of claim 1, further comprising resetting the alarm and re-entering the suspend mode.

3. The method of claim 1, wherein waking up the at least partial structural components of the electronic device comprises:
   determining an occurrence reason of the wake up signal when the wake up signal is generated; and
   waking up a portion but not all of the structural components of the electronic device for controlling the charging when the determined occurrence reason has a wake up reason by the set alarm.

4. The method of claim 3, further comprising waking up all of the structural components of the electronic device when the determined wake up reason is a reason other than the wake up reason by the set alarm.

5. The method of claim 1, wherein turning on or off the charging of the at least one battery comprises:
   turning on the charging when the status of the at least one battery satisfies a charging condition set in the electronic device; and
   turning off the charging when the status of the at least one battery does not satisfy the charging condition set in the electronic device.

6. The method of claim 1, further comprising notifying a user when the charging status is turned from on to off or from off to on.

7. The method of claim 1, wherein determining the status of the at least one battery comprises measuring a temperature of the at least one battery using a temperature sensor.

8. The method of claim 1, further comprising:
   determining whether another alarm different from the alarm is set before setting the alarm; and
   storing the another alarm when the another alarm is set.

9. The method of claim 8, further comprising:
   comparing a time period set for the another alarm with the time period set for the alarm; and
   when the time period set for the another alarm is less than the time period set for the alarm as a result of the comparison, resetting the alarm after the another alarm is completed, and when the time period set for the alarm is less than the time period set for the another alarm as the result of the comparison, resetting the another alarm after the alarm is completed.

10. An apparatus for controlling charging in an electronic device, the apparatus comprising:
    a charging unit which charges at least one battery of the electronic device;
    a temperatures sensor which measures a temperature of the at least one battery;
    an alarm unit which sets an alarm, wherein the alarm generates a wake up signal after a preset time for the alarm elapses; and
    a controller which
       activates the alarm unit and controls such that the electronic device enters a suspend mode, when entry into the suspend mode is requested,
       wakes up at least a portion of structural components of the electronic device, in response to the wake up signal,
       determines the temperature of the at least one battery using the at least partial structural components of the electronic device, and
       turns on or off the charging unit, according to the determined temperature.

11. The apparatus of claim 10, wherein the controller resets the alarm and re-enters the suspend mode.

12. The apparatus of claim 10, wherein the controller determines an occurrence reason of the wake up signal when the wake up signal is generated, and wakes up the at least a portion but not all of the structural components of the electronic device for controlling the charging when the determined occurrence reason is a wake up reason by the set alarm.

13. The apparatus of claim 12, the controller wakes up all of the structural components of the electronic device when the determined wake up reason is a reason other than a wake up reason by the set alarm.

14. The apparatus of claim 10, wherein the controller turns on the charging when the status of the at least one battery satisfies a charging condition set in the electronic device, and turns off the charging when the status of the at least one battery does not satisfy the charging condition set in the electronic device.

15. The apparatus of claim 10, further comprising a display unit which displays a message that notifies when the charging status is turned from on to off or from off to on.

16. The apparatus of claim 10, wherein the controller determines whether another alarm different from the alarm is set before setting the alarm, and stores the another alarm and enters the suspend mode when the another alarm is set.

17. The apparatus of claim 16, wherein the controller compares a preset time for the another alarm with the preset time for the alarm, and resets one of the alarm and the another alarm, when the preset time is greater as a result of the comparison.

18. The apparatus of claim 10, wherein the temperature sensor is a thermistor.

19. The apparatus of claim 10, wherein the alarm unit is a real time clock or a timer.

20. A method for controlling charging in an electronic device, the method comprising:
- when at least one battery of the electronic device is in a charging state or in a charging stop state, and a request for entering into a suspend mode of the electronic device is received, activating a timer, which is set for a time period, generating a wake up signal after the time period elapses, and entering the electronic device into the suspend mode;
- in response to the wake up signal, waking up at least one structural component of the electronic device;
- determining a status of the at least one battery using the at least one structural component of the electronic device; and
- turning on or off the charging of the at least one battery according to the determined status of the at least one battery.

* * * * *